Dec. 14, 1948.  W. A. RAY  2,456,084
FLUID CONTROL VALVE
Filed Dec. 18, 1944  2 Sheets-Sheet 2

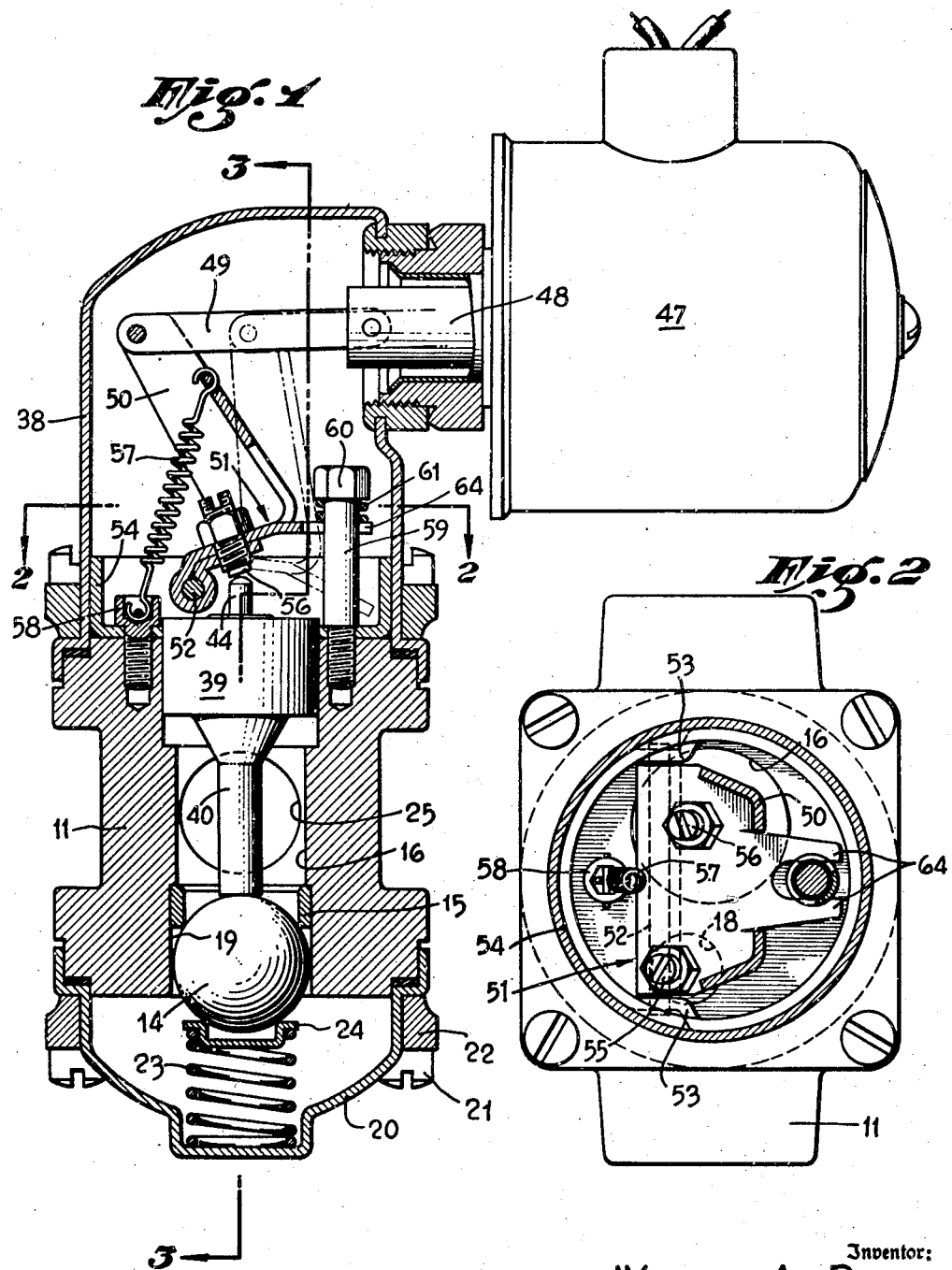

Inventor:
WILLIAM A. RAY,
By John H. Rowe,
Attorney.

Patented Dec. 14, 1948

2,456,084

UNITED STATES PATENT OFFICE 2,456,084

FLUID CONTROL VALVE

William A. Ray, Los Angeles, Calif., assignor to General Controls Co., a corporation Application December 18, 1944, Serial No. 568,676

9 Claims. (Cl. 137—139)

My present invention relates to fluid control valves of the pressure-operated pilot-valve-controlled type.

An object of this invention is to provide a valve, of the character described, which is adapted to be operated by a force which is relatively weak in relation to the flow capacity of the valve.

Another object is to provide means for actuating the pilot valve, and for applying a force to the main valve supplementing the effect produced by the actuation of the pilot valve; these means being substantially independent of each other.

Another object is to provide a single operator for the means set forth in the preceding object, the operator comprising a lever having means whereby the sequence and ratio of actuation of the means can be varied to suit various conditions under which the valves may be employed.

Another object is to so arrange the parts that, in the actuation of the lever, the ratio of movement of the pilot valve to that of the force-applying means is small so that the force can be applied to the main valve or its operator throughout its stroke; an ancillary object being to apply the force continuously to the main valve through a strain-release spring so that movement of the pilot valve is unimpeded.

Another object is to provide a valve employing a piston operated by pressure fluid controlled by an electromagnetically-actuated pilot valve; and, in addition, to provide means for filtering all the fluid passing to these parts so that they are protected from the harmful effect of dirt usually carried by the fluid.

Other objects and advantages of the invention will be found in the description, the drawing, and the claims; and, for full understanding of the invention, reference is to be had to the following detailed description and accompanying drawing, wherein:

Figure 1 is a longitudinal sectional view of a valve embodying the invention;

Figure 2 is a transverse section taken along the line 2—2 of Fig. 1; and

Figure 3:
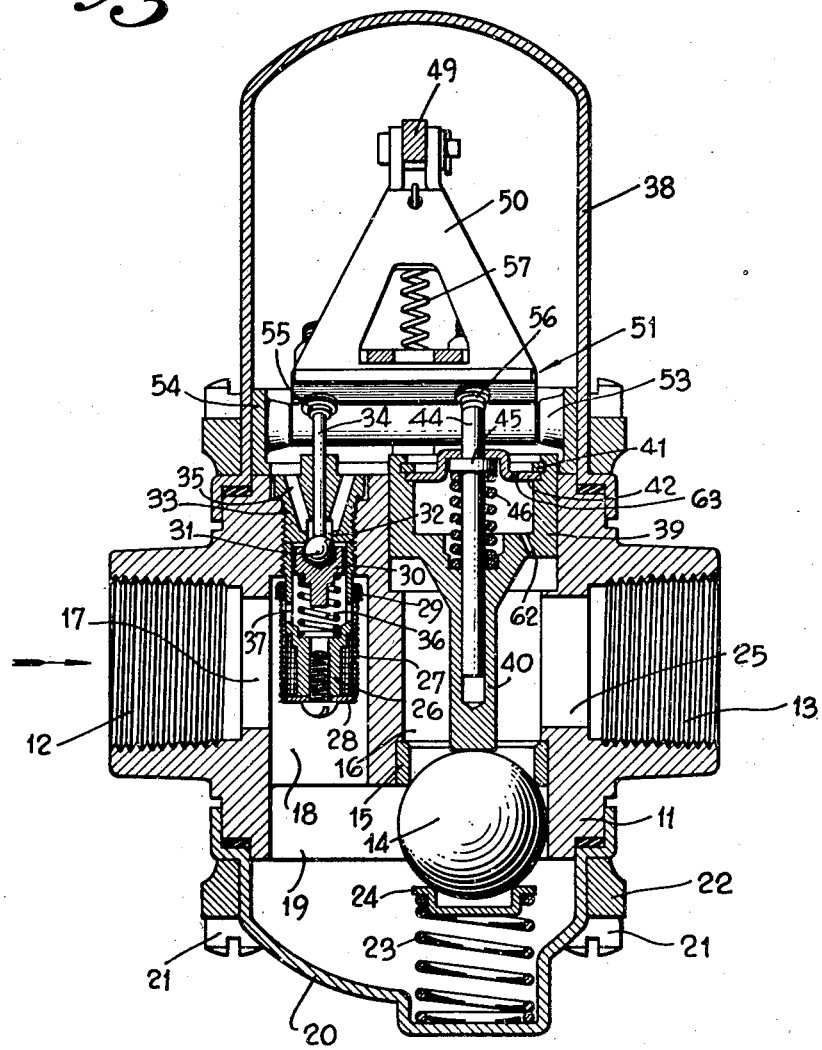
Figure 3 is a longitudinal section in a plane at right-angles to the section of Fig. 1 and taken along the irregular line 3—3 thereof.

In the drawing, the numeral 11 indicates a valve casing having an inlet connection 12 and outlet connection 13. Controlling fluid flow between these connections is a spherical main closure 14 cooperable with an annular seat member 15 pressed in the lower end of a bore 16 formed vertically in the right-hand (as viewed in Fig. 3) upper portion of the casing; communication between the inlet passage 17 and the area around the closure being afforded by the lower portion of another vertical bore 18, formed parallel to bore 16, and a rectangular opening 19 in the bottom of the casing, which opening is covered by a housing 20 secured to the casing by screws 21 cooperating with a ring 22. Urging the closure toward its seat is a spring 23 compressed between the closure and housing 20; the lower end of the spring being received in a cylindrical recess formed in the bottom of the housing, and its upper end bearing against the closure through the medium of a cupped member 24. Branching laterally from bore 16 is the outlet passage 25.

Threaded at its top in the reduced upper portion of bore 18 is a fitting 26 spacedly surrounding the lower end of which, within the enlarged lower portion of bore 18, is a cylindrical strainer 27 having an end wall 28 attached by a screw to the bottom of fitting 26; the strainer having at its top a reenforcing ring 29 which snugly fits the periphery of the fitting. The upper portion of fitting 26 is bored to freely receive a cylinder 30, the top surface of which is recessed for a spherical pilot-valve closure 31. This closure cooperates with an opening 32 bored centrally in the bottom wall of another fitting 33 arranged as an extension of fitting 26. For operating the closure 31, there is a rod 34 freely slidable in a guide opening through the top portion of fitting 33 concentric with opening 32. Extending upwardly from opening 32 in fitting 33 are inclined passages 35.

Within the lower portion of the bore of fitting 26 is a spring 36 which, through the medium of cylinder 30, urges closure 31 upwardly toward seating position. In the side wall of fitting 26 are lateral openings 37. When the pilot closure 31 is open, fluid can pass from the inlet passage 17 through strainer 27, openings 37, interior of fitting 26, around cylinder 30, through opening 32 and passages 35 to the area above the valve casing; which area is enclosed by a housing 38 secured to the casing in the same manner as the lower housing 20.

Reciprocable in the enlarged upper portion of bore 16 is a piston 39 having a reduced cylindrical lower portion 40 engageable with the closure 14. Mounted in the hollow upper end of the piston, and retained by a snap ring 41, is a disk 42, the central portion of which is upwardly cupped and apertured for a rod 44 the lower portion of which is slidable in an elongated opening in the lower portion 40 of the piston. Rigidly attached to the rod 44 is a collar 45 which is urged into engagement with the underside of disk 42 by a compression spring 46 encircling the rod. By this arrangement, rod 44 can move inwardly with respect to the piston against the force of spring 46, its upward or outward movement being limited by the collar 45.

Sealingly mounted in an opening through an upper portion of a side wall of housing 38 is an electromagnetic solenoid operator 47 (Fig. 1) of more-or-less conventional construction and having a plunger 48 which is connected by a pivoted link 49 to an upwardly-bent arm 50 of a lever generally indicated at 51. The lever is mounted at one end on a rod 52, the ends of which rod are pivoted in openings through inwardly-struck opposite portions 53 (see Fig. 2) of the side walls of a shallow cup-shaped member 54 which rests on the top surface of the casing and has in its end wall openings in register with the bores 16 and 18. Intermediate the ends of the generally-horizontal portion of the lever are adjustable screws or tappets 55 and 56 which are positioned to engage the top ends of rods 34 and 44, respectively. As is seen in Fig. 2 (and as is also indicated by the irregular cutting line of Fig. 3) the pilot-valve bore 18 and the piston bore 16 are in different vertical planes as viewed in Fig. 3; for that reason the tappets 55 and 56 are at correspondingly different distances from the pivotal axis of lever 51 so that, when the lever is rocked clockwise or downwardly, the piston rod 44 is moved through a greater distance than is the pilot-valve rod 34. Exerting a counterclockwise rotative force on the lever is a tension spring 57 which is connected at one end to the arm 50 and at its other end to a pin secured within the hollow head of a screw 58; movement of the lever under the force of spring 57 being limited by a screw 59 located between the forked outer extremities 64 of the horizontal portion of the lever, the screw having a head 60 engageable, through a cushioning spring 61, with the lever. With the lever in the position shown, the tappets 55 and 56 are spaced from the respective ends of rods 34 and 44 by distances of a few one-thousandths of an inch. The screws 58 and 59 also serve to secure the cup-shaped member 54 to the valve casing.

When the solenoid 47 is energized, the lever is moved to the position shown in broken lines in Fig. 1 (the inner end of plunger 48 then being in engagement with a stop, not shown). The resultant depression of rods 34 and 44 effects unseating of the pilot-valve closure 31 and compression of spring 46, the bottom of rod 44 then being spaced by a small distance from the bottom of the opening in piston portion 40.

With the opening of the pilot valve, the pressure of the inlet fluid is applied to the top of the piston so that it is forced downwardly, its movement in that direction being aided by the force of the compressed spring 46, with the result that the main closure 14 is forced away from its seat and fluid can then pass through the valve to its outlet 13. It will be observed that the diameter of piston 39 is greater than that of the main-closure port so that the fluid pressure acting upwardly on closure 14 does not impede downward movement of the piston. While the solenoid is energized, the piston is retained in its depressed position due to the difference of fluid pressure acting on its opposite ends, and also due to spring 46 which would become active were there any tendency for the piston to rise. When the solenoid is subsequently deenergized, resultant counterclockwise rotation of the lever effects immediate closing of the pilot valve under the force of its biasing spring; the collar of piston rod 45 snapping back into engagement with disk 42 to initiate upward movement of the piston under the force of the main closure spring, restricted openings 62 and 63 through the bottom wall of the piston and through disk 42, respectively, permitting the necessary displacement of fluid through the piston.

Since the means (rod 34) for actuating the pilot valve and the means (rod 44) for applying a supplemental force to the piston are independently operable by the lever, the tappets 55 and 56 can be so adjusted that, when the solenoid is energized, the opening of the pilot valve occurs slightly before the rod 44 is depressed so that the amount of force required to initiate operation of the main valve is small and its full operation is insured by the follow-through action of spring 46. To meet various conditions under which valves according to this invention may be employed, the ratio of leverage with respect to the rods 34 and 44 can be varied, as by varying the position of the pilot valve and piston. As was previously pointed out, the pilot-valve actuating rod 34 is considerably closer to the pivotal axis of the lever than is the piston rod 44 so that force can be applied to the piston throughout its full stroke while moving the pilot closure through a relatively short distance; and, due to the strain-release connection between rod 44 and the piston, afforded by spring 46, initial operation of the pilot valve is substantially unimpeded since this spring is then in only slightly-compressed condition. It will be observed that, due to the provision of strainer 27, all of the fluid passing to the interior of the upper housing 38 is filtered and the relatively-moving parts, which might be injured or bound by dirt usually present in the fluid controlled by the valve, are fully protected therefrom; such parts being the plunger and guide tube of the electromagnetic operator, the pilot-valve rod 34 and its bearing, and piston 39 and its cylinder.

The embodiment of my invention herein shown and described is obviously susceptible of modification without departing from the spirit of the invention, and I intend therefore to be limited only by the scope of the appended claims.

I claim as my invention:

1. In a fluid control valve: a casing having a main passage therethrough provided with a valve seat; a closure movable in opposite directions into and out of engagement with said seat to control fluid flow through the valve; a motor for actuating said closure and operable by the pressure of the fluid controlled by the valve, said motor comprising a movable partition; a pilot valve for controlling supply of said fluid to the motor; means for actuating said pilot valve; means, independent of said pilot-valve-actuating means, for applying a resilient force to said motor partition supplementing the force produced by said fluid pressure; a pivoted lever for operating said pilot-valve-actuating means and said force-applying means and engageable therewith at points on the lever at different distances from the pivotal axis thereof; and an additional motor for operating said lever.

2. In a fluid control valve: a casing having a main passage therethrough provided with a valve seat; a closure movable in opposite directions into and out of engagement with said seat and biased toward seating position; a motor for actuating said closure against the force of said bias and operable by the pressure of the fluid controlled by the valve, said motor comprising a movable partition having a portion engageable with said closure; a pilot valve for controlling the supply of said fluid pressure to said partition to effect said movement of the closure; means for actuating said pilot valve; a spring engageable with said partition and effective when compressed to apply a resilient force to the partition supplementing the force produced by said fluid pressure; means for applying the force of said spring to the piston; a pivoted lever independently engageable with said pilot-valve-actuating means and said spring-force applying means and an additional motor for rocking said lever to operate the pilot-valve-actuating means and to substantially simultaneously compress said spring.

3. In a fluid control valve: a casing having a main passage therethrough provided with a valve seat; a closure movable in opposite directions into and out of engagement with said seat and biased toward seating position; a motor for actuating said closure against the force of said bias and operable by the pressure of the fluid controlled by the valve, said motor comprising a movable piston having a portion engageable with said closure; a pilot valve for controlling the supply of said fluid pressure to said piston to effect said movement of the closure; means for actuating said pilot valve; a spring engageable with said piston and effective when compressed to apply a resilient force to the piston supplementing the force produced by said fluid pressure; means for applying the force of said spring to the piston; a pivoted lever independently engageable with said pilot-valve-actuating means and said spring-force applying means and an additional motor for rocking said lever to operate the pilot-valve-actuating means and to substantially simultaneously compress said spring; said lever being engageable with the pilot-valve-actuating means and the spring at points on the lever at different distances from the pivotal axis thereof.

4. In a fluid control valve: a casing having a main passage therethrough provided with a valve seat, a closure movable with respect to said seat to control fluid flow through the valve, a motor operable by the pressure of the fluid controlled by the valve and comprising means forming a pressure chamber defined in part by a movable partition for actuating said closure, a pilot valve for controlling supply of said fluid to said chamber and mounted in a wall of the chamber separate from said movable partition, means in said chamber for operating said pilot valve and for applying a force to said partition supplementing the force produced by said fluid, and an additional motor for operating said last-named means.

5. In a fluid control valve: a casing having a main passage therethrough provided with a valve seat, a closure movable with respect to said seat to control fluid flow through the valve, a motor operable by the pressure of the fluid controlled by the valve and comprising means forming a pressure chamber defined in part by a movable partition for actuating said closure, a pilot valve for controlling supply of said fluid to said chamber and mounted in a wall of the chamber separate from said movable partition, a spring cooperable with said partition and effective when stressed to exert a force on the partition supplementing the force produced by said fluid pressure, means in said chamber for operating said pilot valve and for substantially simultaneously stressing said spring, and an additional motor for operating said last-named means.

6. In a fluid control valve: a casing having a main passage therethrough provided with a valve seat, a closure movable with respect to said seat to control fluid flow through the valve, a motor operable by the pressure of the fluid controlled by the valve and comprising means forming a pressure chamber defined in part by a movable partition for actuating said closure, a pilot valve for controlling supply of said fluid to said chamber and mounted in a wall of the chamber separate from said movable partition, a lever in said chamber for operating said pilot valve and for applying a force to said partition supplementing the force produced by said fluid, said lever being arranged to act on the pilot valve and the partition at points on the lever at different distances from the pivotal axis thereof, and an additional motor for operating said lever.

7. In a fluid control valve: a casing having a main passage therethrough provided with a valve seat, a closure movable in opposite directions into and out of engagement with said seat and biased toward seating position, a motor operable by the pressure of the fluid controlled by the valve and comprising means forming a pressure chamber defined in part by a movable partition for operating said closure, a pilot valve for controlling supply of said fluid to said chamber and mounted in a wall of the chamber separate from said movable partition, a spring cooperable with said partition and effective when stressed to exert a force on the partition supplementing the force produced by said fluid pressure, a lever in said chamber for operating said pilot valve and for substantially simultaneously stressing said spring, said lever being arranged to act on the pilot valve and the spring at points on the lever at different distances from the pivotal axis thereof, and an additional motor in said chamber for operating said lever.

8. In a fluid control valve: a casing having a main passage therethrough provided with a valve seat, a closure movable with respect to said seat to control fluid flow through the valve, there being a pair of spaced openings bored through a wall of said casing and communicating respectively with the inlet and the outlet end of said passage, a pilot valve mounted in the inlet one of said openings, a piston reciprocable in the other of said openings and having a connection for operating said closure, a housing enclosing the outer end of said openings and forming a pressure chamber, means in said chamber for operating said pilot valve so as to admit pressure fluid to the chamber and for substantially simultaneously applying a resilient force to said piston supplementing the force produced by the fluid pressure in the chamber, and means in said chamber for operating said last-named means.

9. In a fluid control valve: a casing having a main passage therethrough provided with a valve seat, a closure movable with respect to said seat to control fluid flow through the valve, there being a pair of spaced openings bored through a wall of said casing and communicating respectively with the inlet and the outlet end of said passage, a pilot valve mounted in the inlet one of said openings, a piston reciprocable in the other of said openings and having a connection for operating said closure, a housing enclosing the outer end of said openings and forming a pressure chamber, a spring cooperable with said piston and effective when stressed to exert a force on the piston supplementing the force produced by the fluid pressure in said chamber, a lever in said chamber for operating said pilot valve so as to admit pressure fluid to the chamber and for substantially simultaneously stressing said spring, said lever being arranged to act on the pilot valve and the spring at points on the lever at different distances from the pivotal axis thereof, and an electric motor mounted on the outside of said housing and having means sealingly extending within said chamber for operating said lever.

WILLIAM A. RAY.

REFERENCES CITED

The following references are of record in the file of this patent:

UNITED STATES PATENTS

| Number | Name | Date |
|---|---|---|
| 231,592 | Leach | Aug. 24, 1880 |
| 723,118 | Zindel | Mar. 17, 1903 |
| 988,623 | Bowman | Apr. 4, 1911 |
| 1,989,341 | Shenton | Jan. 29, 1935 |
| 2,087,387 | Price | July 20, 1937 |
| 2,117,726 | Johnson | May 17, 1938 |
| 2,327,366 | Nampa | Aug. 24, 1943 |